United States Patent
Degenhardt

(10) Patent No.: US 11,583,708 B2
(45) Date of Patent: Feb. 21, 2023

(54) OXYGEN EMERGENCY SUPPLY FOR PASSENGERS IN AN AIRCRAFT OR AIRCRAFT WITH SUCH AN EMERGENCY OXYGEN SUPPLY FOR PASSENGERS

(71) Applicant: B/E Aerospace Systems GmbH, Lubeck (DE)

(72) Inventor: Detlev Degenhardt, Stockelsdorf (DE)

(73) Assignee: B/E Aerospace, Inc., Winston-Salem, NC (US)

( * ) Notice: Subject to any disclaimer, the term of this patent is extended or adjusted under 35 U.S.C. 154(b) by 761 days.

(21) Appl. No.: 16/239,393

(22) Filed: Jan. 3, 2019

(65) Prior Publication Data

US 2020/0215358 A1    Jul. 9, 2020

(51) Int. Cl.
*A62B 7/14* (2006.01)
*A62B 7/04* (2006.01)
*B64D 13/00* (2006.01)

(52) U.S. Cl.
CPC .................. *A62B 7/14* (2013.01); *A62B 7/04* (2013.01); *B64D 13/00* (2013.01); *B64D 2231/025* (2013.01)

(58) Field of Classification Search
CPC ......... A62B 7/00–08; A62B 7/14; A62B 9/00; A62B 9/02–022; A62B 9/027; A62B 17/00; A62B 18/00; A62B 18/006; A62B 18/02; A62B 18/10; B64D 13/00; B64D 2231/00–025
See application file for complete search history.

(56) References Cited

U.S. PATENT DOCUMENTS

| 4,449,524 A * | 5/1984 | Gray ........................ A62B 9/00 128/202.27 |
| 7,588,032 B2 * | 9/2009 | Cannon .................... A62B 7/14 128/203.25 |

(Continued)

FOREIGN PATENT DOCUMENTS

| DE | 102004042388 B3 | 9/2005 |
| DE | 102009037380 A1 | 2/2011 |

(Continued)

OTHER PUBLICATIONS

Office Action dated May 27, 2020 for EP Application No. 19220265.

*Primary Examiner* — Rachel T Sippel
(74) *Attorney, Agent, or Firm* — Suiter Swantz pc llo

(57) ABSTRACT

The emergency oxygen supply for passengers in an aircraft comprises an oxygen source with a number of pulse breathing masks which are conductively connected to the oxygen source, wherein an individual shut-off valve which in the non-actuated condition is switched to block is provided in each conduit to a breathing mask. The emergency oxygen supply moreover comprises an impulse breathing control for actuating each individual shut-off valve, as well as an auxiliary conduit which connects the oxygen source to the breathing masks whilst bypassing the individual shut-off valves and which in each case via a check valve is connected to the respective conduit which leads to the breathing mask, or to the breathing mask itself. The auxiliary conduit is connected to the oxygen source via a central shut-off valve which is switched to open in the non-actuated condition.

6 Claims, 2 Drawing Sheets

(56) References Cited

U.S. PATENT DOCUMENTS

Figure 1:
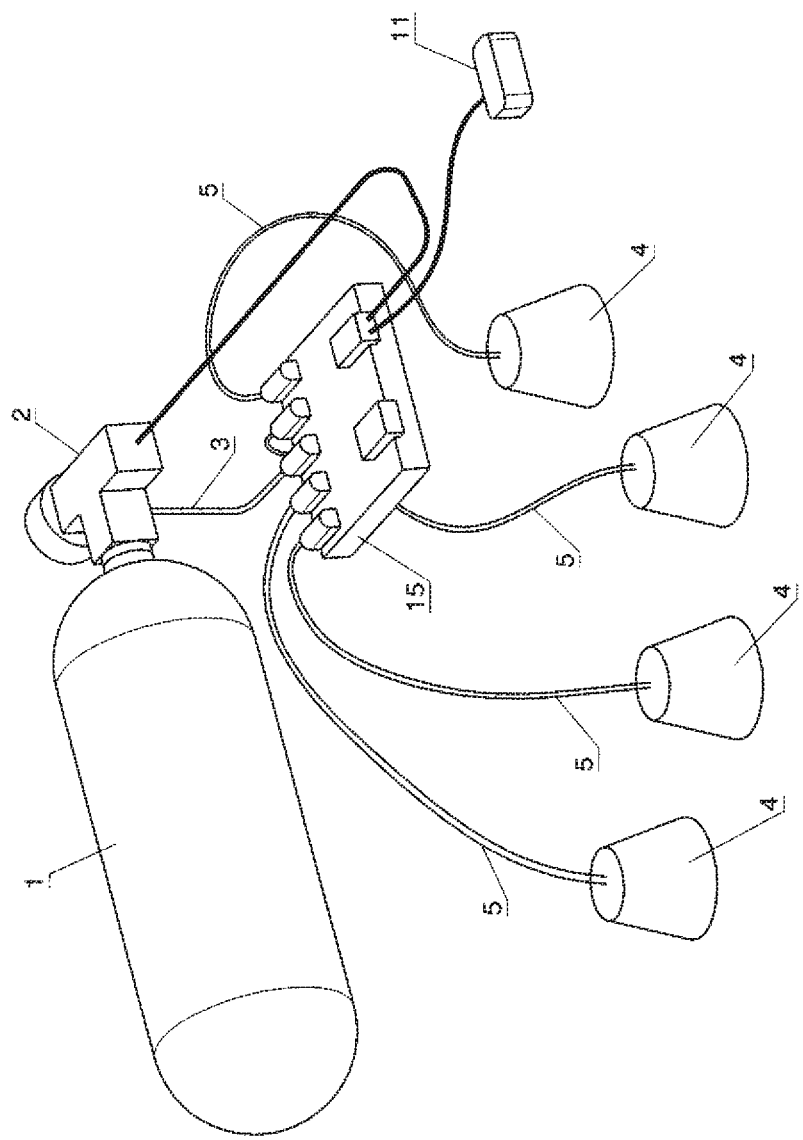

| | | | |
|---|---|---|---|
| 2003/0196707 A1* | 10/2003 | Meckes | A62B 7/14 |
| | | | 137/599.09 |
| 2005/0257790 A1* | 11/2005 | McNeirney | A61M 16/22 |
| | | | 128/203.12 |
| 2006/0118115 A1 | 6/2006 | Cannon | |
| 2007/0107727 A1* | 5/2007 | Brichetto | A62B 7/14 |
| | | | 128/201.22 |
| 2007/0144597 A1 | 6/2007 | Cazenave et al. | |
| 2011/0036351 A1 | 2/2011 | Conrad et al. | |
| 2012/0255446 A1* | 10/2012 | Eickhoff | A61M 16/101 |
| | | | 96/111 |
| 2013/0220317 A1* | 8/2013 | Rittner | A62B 7/08 |
| | | | 128/202.26 |
| 2014/0137859 A1* | 5/2014 | Wilkinson | A61M 16/0816 |
| | | | 128/202.26 |
| 2015/0141887 A1* | 5/2015 | Kawashima | F16K 11/22 |
| | | | 601/149 |
| 2019/0185166 A1 | 6/2019 | Neumann et al. | |
| 2019/0224505 A1 | 7/2019 | Walker et al. | |

FOREIGN PATENT DOCUMENTS

| | | |
|---|---|---|
| DE | 102005013658 B4 | 6/2015 |
| EP | 2630992 A1 | 8/2013 |
| WO | 2005016750 A2 | 2/2005 |
| WO | 2007068845 A1 | 6/2007 |
| WO | 2008125572 A2 | 10/2008 |
| WO | 2013124344 A1 | 8/2013 |

* cited by examiner

OXYGEN EMERGENCY SUPPLY FOR PASSENGERS IN AN AIRCRAFT OR AIRCRAFT WITH SUCH AN EMERGENCY OXYGEN SUPPLY FOR PASSENGERS

The invention relates to an emergency oxygen supply for passengers in an aircraft and to an aircraft with such an emergency oxygen supply.

Emergency oxygen supplies for passengers in an aircraft are counted as belonging to the state of the art and serve for ensuring that the passengers are supplied with an adequate quantity of oxygen in the case of a sudden pressure drop at a great altitude, until the aircraft has descended to an altitude, at which it is ensured that the passengers can be adequately supplied with oxygen from the surroundings. Containers with breathing masks are typically located above the rows of seats for this, said containers opening in the case of a sudden pressure drop, so that the breathing masks drop down towards the passengers and provide the necessary oxygen for the passengers by way of oxygen generators or from compressed oxygen bottles/tanks. Herein, there are systems which continuously feed oxygen to the breathing masks, said oxygen being intermediately stored in a re-breather bag which is located on the breathing mask, and those systems which at the beginning of the inhalation feed a metered quantity of oxygen, the so-called bolus volume, to the user and subsequently supply the air of the surroundings as the breathing gas. The latter breathing masks, so-called pulse breathing masks, do not have re-breather bag and are connected to the emergency oxygen supply in a direct manner via a conduit. The latter supply principle is particularly favourable with regard to the oxygen quantity which is to be carried along, since here the oxygen which is provided goes into the lungs of the passengers in an almost complete manner and can therefore be present in a reduced quantity compared to the first-mentioned system. For this however, it is necessary for a separate shut-off valve (individual shut-off valve) to be assigned to each pulse breathing mask, said shut-off valve being activated by way of an impulse breathing control and controlling the oxygen quantity, i.e. the time, in which the valve must be opened, in dependence on the cabin pressure and specifically such that the valve opens and the necessary oxygen quantity is provided at the beginning of inhalation, thus when a vacuum arises in the pulse mask. The detection of a vacuum/underpressure is effected by a pressure sensor or a pressure switch in the breathing mask or in the conduit which feeds the oxygen to this.

Such an emergency oxygen supply is known for example from DE 10 2005 013 658 B4. The impulse breathing regulator which is described there operates in a mechanical manner, i.e. is complicated in its design, expensive and heavy. Systems with electromagnetically controlled individual shut-off valves which are inexpensively available in a small size as on/off valves are more economical as far as this is concerned. Such a system is known from DE 10 2004 042 388 B3.

The disadvantage concerning the electromagnetically controlled valves is the fact that at least one emergency electricity supply must also always be present in emergency situations, in which these must function, A RAM air turbine which ensures that an emergency electricity supply, albeit quite small, is ensured even in the case of a failure of all engines is provided in passenger aircraft for this.

Starting from this state of the art, it is the object of the invention to provide an emergency oxygen supply for passengers in an aircraft which on the one hand is inexpensive in manufacture and saves weight, but on the other hand ensures an adequate supply of oxygen to the passengers even in the case of failure of the emergency electricity supply.

According to the invention, this object is achieved by an emergency oxygen supply having the features specified in claim 1. Advantageous embodiments of the invention are specified in the dependent claims, the subsequent description and the drawings. The solution according to the invention moreover provides an aircraft with such an emergency oxygen supply.

An emergency oxygen supply in the context of the invention is to be understood as a device, an appliance or a system which, departing from an oxygen source and via a conduit network with valve arrangements, supplies a number of oxygen masks, thus breathing masks, with the oxygen which is necessary for the passengers in the aircraft in the case of a sudden pressure drop. An aircraft in the context of the present invention can be any flying object which can be located at such altitudes which are critical concerning the supply of breathing gas, typically altitudes above 10,000 feet.

The inventive emergency oxygen supply for passengers in an aircraft comprises an oxygen source which can be formed of one or more compressed oxygen gas bottles (containers) and/or of one or more chemical oxygen generators and which supplies a number of pulse breathing masks which are conductively connected to the oxygen source. A shut-off valve is herein provided in each conduit to a breathing mask and is hereinafter called individual shut-off valve and is designed such that it is switched to block in the non-actuated condition. Furthermore, an impulse breathing control which is for actuating or controlling each individual shut-off valve and typically but not necessarily is formed by an electronic circuit is provided. According to the invention, an auxiliary conduit (also called emergency conduit) is provided, wherein this auxiliary conduit connects the oxygen source to the breathing masks whilst bypassing the individual shut-off valves and via a check-valve is connected to the respective conduit which leads to the breathing mask, or, if a separate connection for this auxiliary conduit is provided on the breathing mask, to the breathing mask itself. This auxiliary conduit is connected to the oxygen source via a further shut-off valve which functions as a bypass valve and which is hereinafter called a central shut-off valve, wherein this central shut-off valve is designed such that it is switched to open in the non-actuated condition.

The basic concept of the solution according to the invention is on the one hand to provide an emergency oxygen supply system which is optimised with regard to the oxygen requirement, thus is merely envisaged for providing the bolus volume and thus with regard to its construction is simple, weight-saving and reliable, i.e. comprises individual shut-off valves, typically magnet valves, but on the other hand still provides adequate oxygen even given an failure of the emergency electricity supply itself. According to the invention, this is realised by the provision of an auxiliary conduit, thus an additional conduit which departing from the oxygen source is connected to the breathing masks whilst bypassing the individual shut-off valves, thus in a manner parallel to these. Herein, a check valve is provided in this auxiliary conduit, in each case upstream of the breathing mask, so that no gas can be brought into this auxiliary conduit via the breathing masks. Moreover, a central shut-off valve, thus a shut-off valve as a bypass valve between the oxygen source and the branches to the breathing masks is provided in the auxiliary conduit, wherein this central shut-off valve is switched to open in the non-actuated condition. This arrangement, by way of a suitable electrical circuiting, allows the assurance of this central shut-off valve being able to be activated or actuated such that it blocks in normal emergency operation when an electricity supply or an emergency electricity supply is present, and only when the emergency oxygen supply itself fails does it switch into the non-actuated, i.e. opened condition, so that then a continuous flow of oxygen through the auxiliary conduit to the breathing masks is still ensured.

Herein, the emergency oxygen supply according to the invention is to be operated such that the central shut-off valve is without current (currentless) and thus open in normal operation of the aircraft, thus when the emergency oxygen supply is not in operation, but on standby. In contrast, in normal emergency operation, i.e. when an emergency supply of oxygen to the passengers is effected via breathing masks, the central shut-off valve is activated to block and specifically for as long as an electricity supply or emergency electricity supply exists. It is to be understood that the emergency oxygen supply comprises a further shut-off mechanism which is arranged upstream, e.g. a further central mains shut-off valve which is arranged upstream and which is not opened until the operation of the emergency oxygen supply, so that no oxygen flows through the opened central shut-off valve in normal operation of the aircraft. Herein, in emergency operation, the individual shut-off valves of the activated pulse breathing masks are controlled by the associated impulse breathing control. This can be effected for as long as a supply of electricity is present, be it the normal electricity supply or emergency electricity supply of the aircraft. Only when this fails does the design according to the invention go into action, concerning which the central shut-off valve goes into its non-actuated, i.e. opened position due to it no longer being actuated on account of the power failure, whilst the individual shut-off valves likewise go into their non-actuated, but blocking position given a power (electricity) failure. Here, it is advantageous if the individual shut-off valves and/or the central shut-off valve are electromagnetically actuated and are currentless in the non-actuated condition. Such magnet valves are inexpensively available and stable over the longer term. The central shut-off valve as well as the individual shut-off valves is hereby also advantageously electromagnetically actuated, but electromotorically or pneumatically actuated valves can also be applied.

It is particularly with electromotoric valves that one needs to possibly provide a spring arrangement for restoring into the non-actuated condition, said spring arrangement ensuring that the respective valve always falls back into the same initial condition when not actuated.

According to the invention, the individual shut-off valves or the central shut-off valve, advantageously all shut-off valves are advantageously designed as on/off valves, thus valves which only know two switching conditions and which are particularly simple to handle with regard to control technology.

According to the invention, a flow reducer preferably in the form of a nozzle is provided upstream or downstream of the central shut-off valve in the flow direction, in order on the one hand to ensure that the oxygen goes through the conduit network to the breathing masks in a reliable manner, but on the other hand to however ensure that not much more oxygen than is necessary given continuous flow operation flows through. The gas which comes from the oxygen bottle/tank at a high pressure is firstly led via a pressure reducer which reduces the pressure to approx. 2 bar. The flow reducer which is in the form of a nozzle and which is preferably connected (arranged) downstream of the central shut-off valve in the flow direction is herein designed such that a continuous flow of oxygen is provided for the impulse breathing masks as soon as these are activated, said oxygen flow being sufficient to provide the body with an adequate quantity of oxygen even without a re-breather bag.

In an analogous manner, it is advantageous to also assign a flow reducer to the individual shut-off valves, said flow reducer preferably being arranged downstream of the individual shut-off valve in the flow direction and being designed as a nozzle. In this manner, the necessary flow of oxygen to the pulse masks can be ensured by individual shut-off magnet valves which are simple with regard to their design and are freely selectable with regard to the flow cross section, in combination with the nozzles which are arranged downstream.

A pressure sensor or pressure switch, by way of which the inhalation phase of each activated breathing mask can be detected is provided, so that the oxygen which is fed to the breathing masks is present at the correct point in time, thus when the inhalation procedure of the passenger who has put on the impulse breathing mask begins. A certain vacuum results on account of this, and this is detected by a pressure sensor or pressure switch and its presence is communicated via an electrical and/or data connection to the impulse breathing control which then activates the respective individual shut-off valve to open at the correct point in time, thus when the inhalation procedure begins.

It is advantageous to detect the cabin pressure in the aircraft, by way of a further pressure sensor, so that the necessary time, during which the individual breathing valve is to be activated to open can be determined on the part of the impulse breathing control by way of a suitable algorithm or a stored table, so as to ensure that an adequate but as low as possible quantity of oxygen is provided which is to say only the bolus volume. Such a pressure sensor which measures the ambient pressure can be arranged at practically any location of the system.

It is basically insignificant for the function of the emergency oxygen supply according to the invention as to the way and manner in which the oxygen is produced. However, oxygen stored in pressure bottles (pressure cylinders) is advantageously used for the emergency oxygen supply according to the invention, wherein a pressure reduction valve which is arranged downstream of the pressure bottle ensures that the pressure in the conduit network of the emergency oxygen supply, thus in the region of the network where the individual shut-off valves are arranged, up to the breathing masks, has an operating pressure for example of 2 bar.

According to an advantageous further development of the invention, one envisages designing the central shut-off valve as a self-holding valve, in order to keep the electricity consumption of the emergency oxygen supply as low as possible in normal emergency operation as long as an electricity supply is present. Here, it is preferably the case of an impulse-controlled magnet valve which for actuation merely requires a pulse, as is typically given on switching on the voltage supply, but which only requires the voltage for the self-holding.

The emergency oxygen supply according to the invention is operated such that when the emergency oxygen supply is in operation, the central shut-off valve is activated to block, and specifically for as long as an electricity supply or an emergency electricity supply exists, wherein in emergency operation, thus when the emergency oxygen supply is in operation, the individual shut-off valves of the activated pulse breathing masks are controlled by the associated impulse breathing control. It is to be understood that the impulse breathing control also operates independently of an activation in the case of systems which require no activation of the oxygen source. Usually however, after the breathing masks fall down from the personal service unit, the oxygen supply to the individual mask is not activated until the breathing mask is pulled towards the passenger and a switching mechanism is triggered by this, or until an inhalation impulse is detected.

Figure 2:
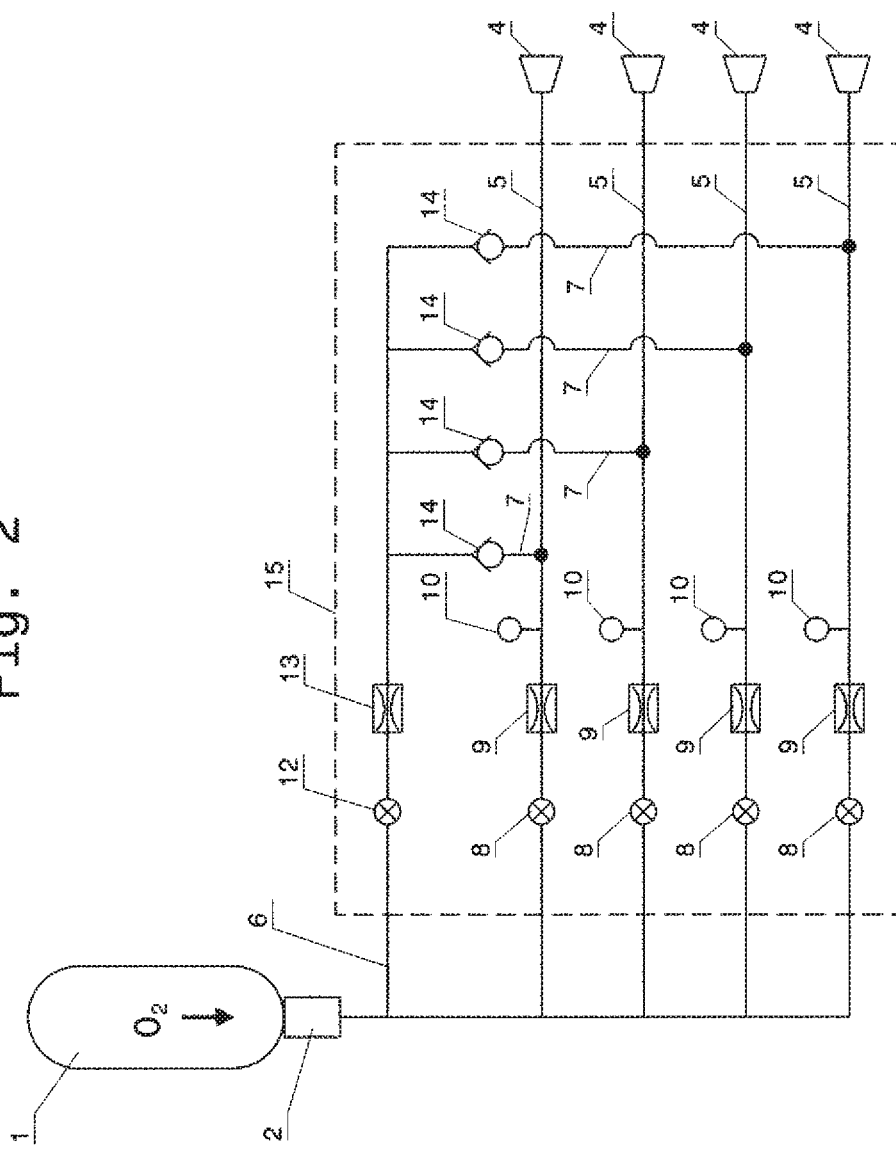

The invention is hereinafter explained in more detail by way of one embodiment example which is represented in the drawing. There are shown in:

FIG. 1 the components of an emergency oxygen supply in an aircraft, in a schematic representation and FIG. 2 a block diagram of the emergency oxygen supply according to FIG. 1.

The emergency oxygen supply which is represented by way of FIGS. 1 and 2 is arranged in the known manner in an aircraft which is not represented in the drawing, as is counted as belonging to the state of the art, to which one refers inasmuch as this is concerned.

The represented emergency oxygen supply comprises a compressed oxygen bottle 1, in which oxygen is stored at a pressure for example of 200 bar. A pressure reduction valve 2 which reduces the pressure to 2 bar is arranged at the outlet of the compressed oxygen bottle 1 and via a supply conduit 3 provides a conduit network which here comprises conduits 5 which lead to the pulse breathing masks 4 and which are conductively connected to the supply conduit 3. An auxiliary conduit 6 which analogously to the branching of the supply conduit 3 is branched into four conduits 7 which run out into the conduits 5 connects parallel to the supply conduit 3 downstream of the pressure reduction valve 2 in the flow direction.

The supply conduit 3 which in total feeds four of the conduits 5 which lead to the pulse breathing masks 4 is connected in each case via an individual shut-off valve 8 which is designed as an on/off magnet valve, and a nozzle 9 which is arranged downstream, to the conduit 5 which leads to the respective mask 4. A pressure sensor 10, via which the vacuum arising at the mask 4 on inhaling is detected is arranged downstream of the nozzle 9. The pressure which prevails in the surroundings, thus the cabin pressure is detected via a pressure sensor 11 which is represented in FIG. 1. The individual shut-off valves 8 in a manner known per se are each controlled by an impulse breathing control which is not represented in detail in the figures, in dependence on the pressure which is detected by the sensor 10 as well as on the pressure which is detected by the sensor 11. The individual shut-off valves 8 are designed such that given a non-actuation, i.e. in the currentless condition when they obtain no signal from the control, they are switched to block, i.e. they block the conduit path from the supply conduit 3 to the conduit 5. These individual shut-off valves 8 obtain an electrical impulse by way of the impulse breathing control, said impulse activating the electromagnet of the valve and actuating it to open. The impulse is triggered by a corresponding signal of the sensor 10, thus when an inhalation procedure is detected on account of the vacuum arising in the mask 4. The duration of the impulse is directed to the signal of the pressure sensor 11 which determines the pressure of the surroundings and therefore the necessary oxygen quantity which is to be fed to the respective mask 4.

If now, given this arrangement, the supply of electricity or even the emergency electricity supply fails, and then no electrical energy is available for controlling the individual shut-off valves 8, so that the feed of oxygen from the supply conduit 3 to the pulse breathing mask 4 is blocked. A central shut-off valve 12 which is likewise designed as an on/off magnet valve but which is designed such that it is opened given a non-actuation, i.e. in the currentless condition, is arranged in the auxiliary conduit 6. A nozzle 13 is arranged downstream of the valve 12 in the flow direction and the supply conduit 3 branches subsequently to this and is connected in each case via a check valve 14 to the conduits 5 which lead to the masks 4. The nozzle 13 is designed such that given an opened valve 12, a flow of oxygen sets in, said flow being larger than is necessary for the bolus volume of each mask 4 and, given a continuous flow, being sufficient for supplying the masks which are actually designed as impulse masks 4, such that the passengers which are supplied by these are sufficiently supplied with oxygen. Since the central shut-off valve 12 is open in a currentless manner, it is ensured that a supply of the masks 4 via the auxiliary conduit 6 is always ensured given a failure of the electricity supply and emergency electricity supply. The check valves 14 ensure that no gas can flow back from the masks 4 into the conduit 6 in normal emergency operation when the emergency oxygen supply is supplied with electricity. The central shut-off valve 12 is designed as a self-holding impulse valve, so that in designated operation when there is a supply of electricity, it only initially requires energy on being switched-on. However, as soon as the power supply fails, the self-holding is interrupted and the valve 12 falls back into the non-actuated, opened condition.

As is indicated in FIG. 1, concerning the represented emergency oxygen supply, a circuit-board-like component 15 is provided, said component comprising all individual shut-off valves 8, nozzles 9, pressure sensors 10, the central shut-off valve 12, the nozzle 13 and the check valves 14.

LIST OF REFERENCE NUMERALS 1 compressed oxygen bottle
2 pressure reduction valve
3 supply conduit
4 pulse breathing mask
5 conduits to the masks
6 auxiliary conduit
7 conduits
8 individual shut-off valves
9 nozzles
10 pressure sensors
11 pressure sensor
12 central shut-off valve
13 nozzle
14 check valve
15 component

The invention claimed is:

1. An emergency oxygen supply for passengers in an aircraft, with an oxygen source (1) and with a plurality of pulse breathing masks (4) which are connected to the oxygen source (1) via conduits (5), wherein an individual shut-off valve (8) which in a non-actuated condition is switched to block is provided in each conduit (5) to one of the plurality of pulse breathing masks (4), with an impulse breathing control for actuating each individual shut-off valve (8), with an auxiliary conduit (6) which connects the oxygen source (1) to the plurality of pulse breathing masks (4) whilst bypassing the individual shut-off valves (8) and which in each case via a check valve (14) is connected to the respective conduit (5) which leads to the respective pulse breathing mask (4), wherein the auxiliary conduit (6) is connected to the oxygen source (1) via a central shut-off valve (12) which is switched to open in a non-actuated condition, wherein the individual shut-off valves (8) and the central shut-off valve (12) are electromagnetically actuated and are currentless in the non-actuated condition, wherein the central shut-off valve (12) is designed as a self-holding valve, wherein the self-holding valve is an impulse-controlled magnet valve, wherein when the impulse-controlled magnet valve is in designated operation when there is a supply of electricity, the impulse-controlled magnet valve only initially requires energy on being switched-on, wherein as soon as a power supply fails, the impulse-controlled magnet valve is interrupted and the valve (12) falls back into the non-actuated, opened condition, wherein a pressure sensor (10) or a pressure switch for detecting an inhalation phase is assigned to each breathing mask (4) and is electrically and/or data-connected to the impulse breathing control, wherein the impulse breathing control is electrically and/or data-connected to a pressure sensor (11) for detecting a cabin pressure, wherein the individual shut-off valves (8) are each controlled by the impulse breathing control based at least on the pressure which is detected by the pressure sensor (10) or pressure switch and the pressure sensor (11), wherein the individual shut-off valves (8) and the central shut-off valve (12) are on/off valves, wherein a flow reducer (13) is arranged downstream of the central shut-off valve (12).

2. The emergency oxygen supply according to claim 1, concerning which the flow reducer is a nozzle (13) which is arranged downstream of the central shut-off valve (12) seen in a through-flow direction.

3. The emergency oxygen supply according to claim 1, concerning which a nozzle (9) is arranged downstream of each shut-off valve (8) seen in a flow direction.

4. The emergency oxygen supply according to claim 1, concerning which the oxygen source (1) is formed by at least a compressed oxygen bottle (1) with a pressure reduction valve (2) which is arranged downstream of the compressed oxygen bottle (1).

5. An aircraft with the emergency oxygen supply according to claim 1.

6. A method for operating the emergency oxygen supply according to claim 1, concerning which the central shut-off valve (12) is activated to block in normal emergency operation as long as an electricity supply or emergency electricity supply exists, wherein in normal emergency operation, the individual shut-off valves (8) of the activated pulse breathing masks (4) are controlled by the associated impulse breathing control.

* * * * *